(12) United States Patent
Imai

(10) Patent No.: US 11,899,475 B2
(45) Date of Patent: Feb. 13, 2024

(54) FLUID CONTROL VALVE AND FLUID CONTROL DEVICE

(71) Applicant: HORIBA STEC, Co., Ltd., Kyoto (JP)

(72) Inventor: Kazuya Imai, Kyoto (JP)

(73) Assignee: HORIBA STEC, Co., Ltd., Kyoto (JP)

( * ) Notice: Subject to any disclaimer, the term of this patent is extended or adjusted under 35 U.S.C. 154(b) by 0 days.

(21) Appl. No.: 17/447,320

(22) Filed: Sep. 10, 2021

(65) Prior Publication Data

US 2022/0083080 A1 Mar. 17, 2022

(30) Foreign Application Priority Data

Sep. 14, 2020 (JP) .................................. 2020-153607

(51) Int. Cl.

| | | |
|---|---|---|
| G05D 7/06 | (2006.01) | |
| F16K 31/02 | (2006.01) | |
| F16K 41/10 | (2006.01) | |
| F16K 1/36 | (2006.01) | |
| F16K 31/12 | (2006.01) | |
| F16K 1/00 | (2006.01) | |
| F16K 1/52 | (2006.01) | |
| F16K 27/02 | (2006.01) | |
| F16K 1/42 | (2006.01) | |
| F16K 25/00 | (2006.01) | |

(52) U.S. Cl.
CPC ............ *G05D 7/0635* (2013.01); *F16K 31/02* (2013.01); *F16K 1/00* (2013.01); *F16K 1/36* (2013.01); *F16K 1/42* (2013.01); *F16K 1/52* (2013.01); *F16K 25/005* (2013.01); *F16K 27/02* (2013.01); *F16K 31/12* (2013.01); *F16K 41/10* (2013.01); *G05D 7/06* (2013.01)

(58) Field of Classification Search
CPC ........ G05D 7/0635; G05D 7/06; F16K 31/02; F16K 31/12; F16K 1/00; F16K 1/36; F16K 1/42; F16K 1/52; F16K 41/10; F16K 27/02; F16K 25/005
USPC ............................................... 137/212, 487.5
See application file for complete search history.

(56) References Cited

U.S. PATENT DOCUMENTS

| | | | | |
|---|---|---|---|---|
| 5,092,360 A | * | 3/1992 | Watanabe ............. | C04B 37/026 252/62.9 R |
| 7,163,024 B2 | * | 1/2007 | Igawa ................. | F16K 31/1268 92/97 |
| 8,967,200 B2 | * | 3/2015 | Hayashi ................... | F16K 1/34 137/625.33 |

(Continued)

FOREIGN PATENT DOCUMENTS

JP 2016192243 A 11/2016

*Primary Examiner* — Minh Q Le
(74) *Attorney, Agent, or Firm* — Alleman Hall Creasman & Tuttle LLP

(57) ABSTRACT

In order to achieve an enlargement of a seating surface, and to additionally achieve an improvement in productivity while forming this seating surface using a resin layer, without having to sacrifice any of the drive range of the valve body, there is provided a fluid control valve that is formed such that drive force from an actuator is transmitted to a valve body via a plunger, and that controls a flow of a fluid by causing a seating surface of the valve body to move towards or away from a valve seat surface of a valve seat, wherein the valve body is a separate body from the plunger, and the seating surface is formed by a resin layer.

6 Claims, 7 Drawing Sheets

(56) References Cited

U.S. PATENT DOCUMENTS

| | | | |
|---|---|---|---|
| 2006/0175573 A1* | 8/2006 | Ohmi | F16K 51/02 |
| | | | 251/331 |
| 2014/0070128 A1* | 3/2014 | Hayashi | F16K 25/005 |
| | | | 251/359 |
| 2016/0107376 A1* | 4/2016 | Nakajima | H05K 1/0353 |
| | | | 428/447 |
| 2017/0292622 A1* | 10/2017 | Hayashi | G05D 7/0635 |
| 2018/0163883 A1* | 6/2018 | Ieki | F16K 31/00 |
| 2019/0085999 A1* | 3/2019 | Chen | F16K 31/0655 |
| 2020/0166150 A1* | 5/2020 | Miyamoto | G05D 7/0635 |
| 2020/0208656 A1* | 7/2020 | Horiguchi | G01F 1/36 |
| 2022/0083080 A1* | 3/2022 | Imai | G05D 7/0635 |

* cited by examiner

FLUID CONTROL VALVE AND FLUID CONTROL DEVICE

TECHNICAL FIELD

The present invention relates to a fluid control valve and a fluid control device.

TECHNICAL BACKGROUND

As a conventional fluid control valve, as is shown in Patent Document 1, a fluid control valve exists that is formed so as to control the flow of a fluid by transmitting motive force from an actuator to a valve body so that a seating surface of the valve body either approaches or moves away from a valve seat surface of a valve seat.

In this structure, the seating surface of the valve body may be formed by a resin layer made from a fluorine-based resin or the like in order to improve the sealing performance between the valve seat and the valve body.

In a case in which the seating surface is formed in this way by a resin layer, when the gap between the valve seat and the valve body is being closed, as is shown in FIG. 7, the resin layer is pressed in by the valve seat surface. Compared with a structure in which the seating surface is formed from metal, an excessive amount of the stroke distance of the valve body that is provided by the actuator in order to close the gap between the valve seat and the valve body is lost due to this pressed-in portion A diaphragm is provided integrally with the periphery of the seating surface in the valve body of the aforementioned Patent Document 1. Because of this, if an attempt is made to obtain an improvement in the sealing performance by widening the seating surface, then the surface area of the diaphragm is narrowed by a corresponding amount. As a result, because the drive range of the valve body is made narrower by the surface area of the diaphragm, in a structure in which the seating surface is formed by a resin layer, there is a possibility that no effect will be gained from the stroke distance of the aforementioned pressed-in portion, so that there is a limit as to how far the seating surface can be enlarged.

Moreover, in a valve body in which a diaphragm is provided integrally with the periphery of the seating surface, if an attempt is made to use a resin layer to form this seating surface, then processing such as adhering each sheet-shaped fluorine-based resin that has been cut-out for each individual valve body onto that valve body needs to be performed, and the problem of a drop in productivity is generated.

DOCUMENTS OF THE PRIOR ART

Patent Documents

Patent Document 1
Japanese Unexamined Patent Application (JP-A) No. 2016-192243

DISCLOSURE OF THE INVENTION

Problems to be Solved by the Invention

The present invention was therefore conceived in order to collectively solve all of the above-described problems, and it is a principal object thereof to achieve an enlargement of a seating surface, and to additionally achieve an improvement in productivity while forming this seating surface using a resin layer, without having to sacrifice any of the drive range of the valve body.

Means for Solving the Problem

In other words, a fluid control valve according to the present invention is formed such that drive force from an actuator is transmitted to a valve body via a plunger, and controls a flow of a fluid by causing a seating surface of the valve body to move towards or away from a valve seat surface of a valve seat, and is characterized in that the valve body is a separate body from the plunger, and the seating surface is formed by a resin layer.

If the above-described structure is employed, then because the valve body is formed as a separate body from the plunger, if a diaphragm is provided on the plunger, it is possible to achieve an enlargement of the seating surface without having to reduce the surface area of the diaphragm, in other words, without having to sacrifice any of the drive range of the valve body because of the diaphragm.

Furthermore, because the valve body is formed as a separate body from the plunger, it is possible, for example to adhere a single sheet of fluorine-based resin to a plurality of valve bodies, so that a seating surface can be formed from a resin layer on a plurality of valve bodies in a single operation, thereby enabling an improvement in productivity to be achieved.

One aspect in which the above-described actions and effects are demonstrated even more conspicuously is an aspect in which the fluid control valve is what is known as a 'normal open type' of valve, in other words, is a valve in which, in a state in which voltage is not being applied to the actuator, a gap is formed between the seating surface and the valve seat surface, and, when voltage is applied to the actuator, the valve body is made to approach the valve seat by drive force from the actuator so as to reduce the flow rate.

Compared with what is known as a 'normal closed type' of fluid control valve, the problem of sheet leaks in a closed state is more conspicuous in this normal open type of fluid control valve, so that the effect of an improved sealing performance provided by the seating surface that is formed using the above-described resin layer is demonstrated even more conspicuously.

A more specific embodiment of a normal open type of valve is an embodiment in which the seating surface is a lower surface of the valve body.

Another embodiment is an embodiment in which the fluid control valve is what is known as a 'normal closed type' of valve, in other words, is a valve in which, in a state in which voltage is not being applied to the actuator, the valve body is seated in the valve seat, and, when voltage is applied to the actuator, the valve body is made to move away from the valve seat by drive force from the actuator so as to increase the flow rate.

It is preferable that a cross-link modified fluorine-based resin is used for the resin layer.

A cross-link modified fluorine-based resin is cross-linked by irradiating a fluorine-based resin with ionizing radiation under specific conditions. During this cross-linking, because the fluorine-based resin itself chemically couples with a metal and is able to adhere directly to a metal substrate, it is possible to eliminate the need for an adhesive layer such as a primer or the like that might possibly become a source of contamination. Note that the cross-linking referred to here is a mutual cross-linking between resins, and does not refer to a cross-linking between a metal and a resin.

In order to obtain an improvement in the workability of the resin layer, it is preferable that a recessed portion be formed in a surface of the valve body that faces the valve seat, and that the resin layer be provided in this recessed portion.

In a conventional fluid control valve, a structure is employed that causes the valve body and the plunger to come into mutual surface contact with each other. In this type of structure, the fluid control valve is easily affected by the degree of tolerance that is generated during the machine processing of the valve body and the valve seat, and any tilt of the valve body that is generated by the contact between the valve seat and the valve body causes the plunger to also tilt. Because of this, a high degree of precision is needed in the manufacturing steps of the respective components and in the assembly step of the respective components. In addition, if a state in which the valve body and the plunger are in mutual surface contact with each other is maintained, then residual fluid accumulates in the gap between them so that the valve body and the plunger deteriorate because of this residual fluid.

For this reason, it is preferable that the valve body and the plunger be in mutual contact via a tilt-inhibiting projection that inhibits tilting of the plunger that is generated by the contact between the valve seat and the valve body.

If this type of structure is employed, then because the valve body and the plunger are in mutual contact via a tilt-inhibiting projection, it is difficult for any tilt of the valve body that is generated as a result of the contact between the valve body and the valve seat to be transmitted to the plunger. As a consequence, the tilt of the plunger relative to the valve seat can easily be kept constant. Furthermore, it is difficult for residual fluid to accumulate in the gap between the valve body and the plunger, so that even if the valve body and the plunger are maintained in a state of mutual contact with each other, it is difficult for the valve body and the plunger to deteriorate as a result of this.

Moreover, a fluid control device according to the present invention is characterized in being provided with the above-described fluid control valve. If this type of structure is employed, then the same type of action and effects can be achieved as those obtained from the above-described fluid control valve.

Effects of the Invention

According to the present invention which is formed in the above-described manner, it is possible, without having to sacrifice any of the drive range of the valve body, to not only achieve an enlargement of the seating surface, but by forming this seating surface using a resin layer, an improvement in productivity can also be achieved.

BEST EMBODIMENTS FOR IMPLEMENTING THE INVENTION

Hereinafter, an embodiment of a fluid control valve according to the present invention, and of a fluid control device that utilizes this fluid control valve will be described based on the drawings.

The fluid control device according to the present embodiment is what is known as a 'mass flow controller' that is used in a semiconductor manufacturing process. Note that the fluid control device according to the present invention can be used not only in a semiconductor manufacturing process, but in other types of processes as well.

Figure 1:
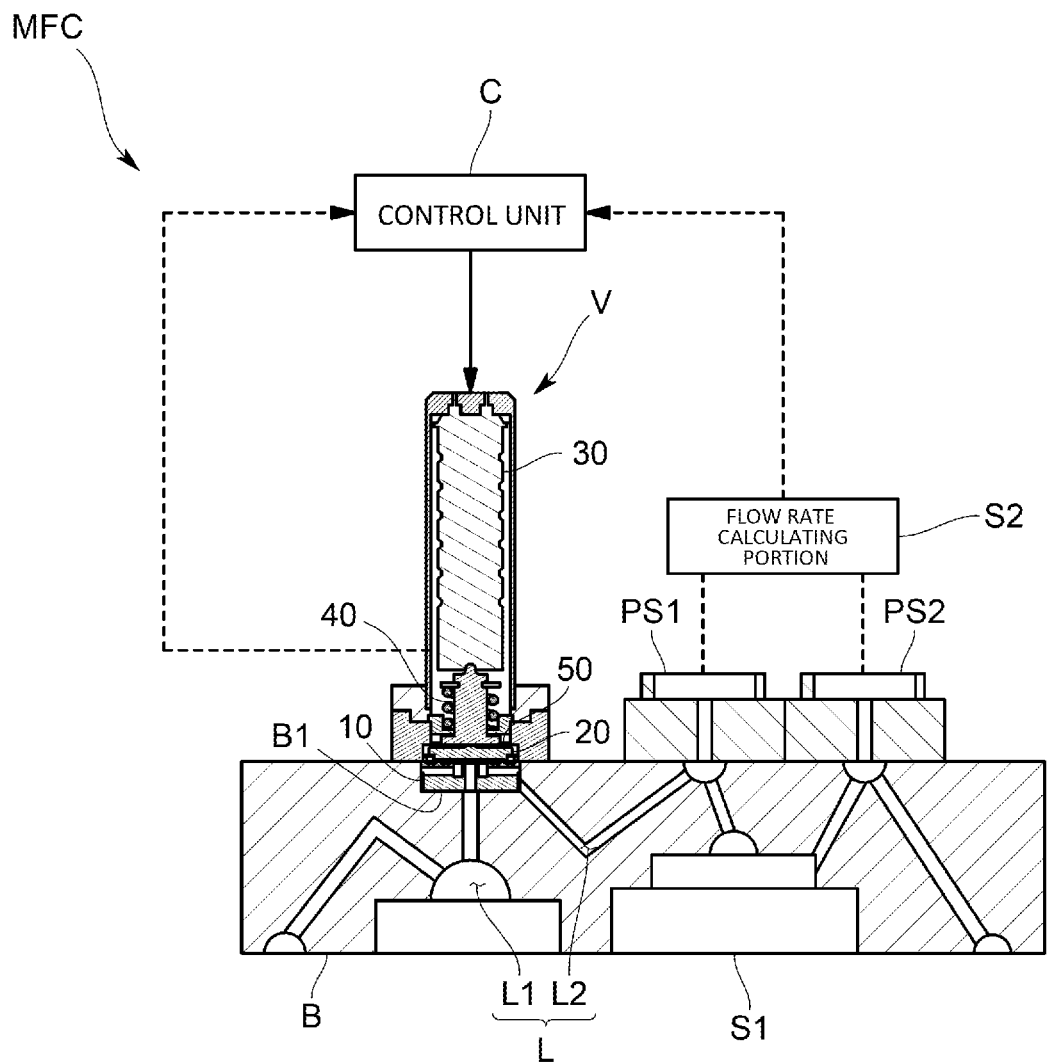
FIG. 1 is a schematic view showing an overall structure of a fluid control device of an embodiment of the present invention.

As is shown in FIG. 1, the fluid control device MFC in this case is a pressure based MFC. More specifically, this fluid control device MFC is provided with a block body B inside which are provided flow paths L, a fluid control valve V that is mounted on the block body B, a pair of pressure sensors PS1 and PS2 that are mounted on the block body B on a downstream side from the fluid control valve V, and a control unit C that performs feedback control on the fluid control valve V so that a flow rate value for the flow path L that is calculated based on pressure values measured by the pair of pressure sensors PS1 and PS2 approximates a previously determined target value.

Note that because the fluid control device MFC of the present embodiment is characterized in being provided with the fluid control valve V, firstly, a peripheral structure of the fluid control valve V will be described.

The block body B is formed, for example, in a rectangular parallelepiped shape, and the fluid control valve V and the pair of pressure sensors PS1 and PS2 are mounted on a predetermined surface thereof. Moreover, a recessed housing portion B1 whose purpose is to enable the fluid control valve V to be mounted on the predetermined surface is also provided in the block body B1, and the flow path L is divided into an upstream-side flow path L1 and a downstream-side flow path L2 by this housing portion B1. In addition, one end of the upstream-side flow path L1 opens onto a bottom surface of the housing portion B1, while one end of the downstream-side flow path L2 opens onto a side surface of the housing portion B1.

The pair of pressure sensors PS1 and PS2 are connected respectively to an upstream side and a downstream side of a laminar flow element S1 on the flow path L, and both are also connected to a flow rate calculating portion S2 that calculates a flow rate based on outputs from the pair of pressure sensors PS1 and PS2. The pair of pressure sensors PS1 and PS2 are mounted on the predetermined surface of the block body B so as to be arranged in a row together with the fluid control valve V.

The control unit C includes what is known as a computer that is provided with a CPU, memory, and an A/D–D/A converter and the like, and as a result of programs stored in the memory being executed, various types of instruments are made to operate in mutual collaboration with each other so that various functions are implemented. More specifically, the control unit C performs feedback control on a valve opening of the fluid control valve V such that a flow rate value calculated by the flow rate calculating portion S2 approximates a target value stored in advance in the memory.

Next, the fluid control valve V of the present embodiment will be described.

Figure 2:
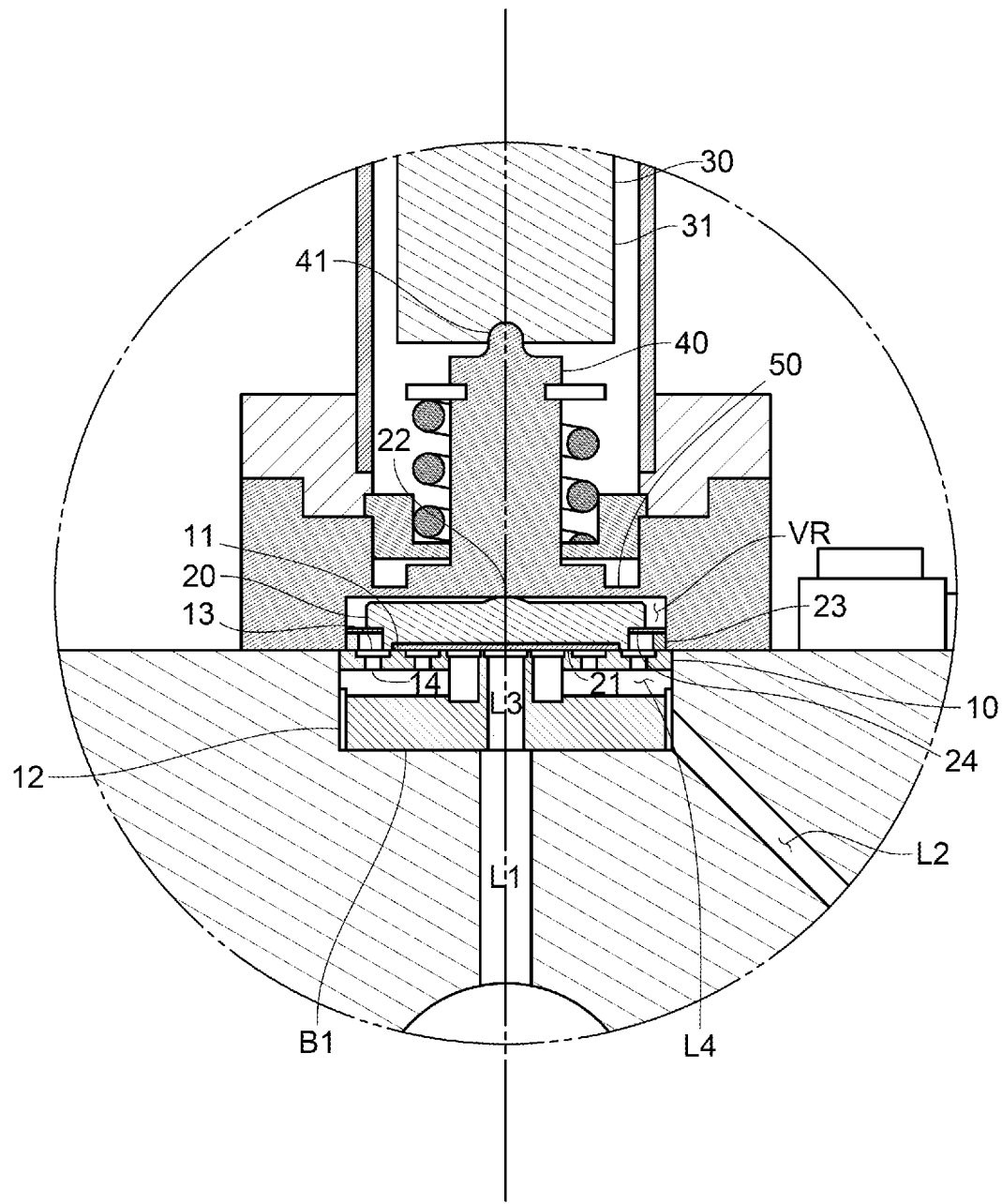
FIG. 2 is a schematic view showing a partial structure of a fluid control valve of the same embodiment.

The fluid control valve V of the present embodiment is what is known as a normal open type of valve. More specifically, as is shown in FIG. 1 and FIG. 2, this fluid control valve V is provided with a valve seat 10 that fits into the housing portion B1 in the block body B, a valve body 20 that is mounted so as to be able to move in directions both towards and away from the valve seat 10, an actuator 30 that moves the valve body 20, a plunger 40 that is interposed between the valve body 20 and the actuator 30 and transmits drive force from the actuator 30 to the valve body 20, and a diaphragm 50 in the form of a thin membrane that is provided integrally with the plunger 40 and forms a valve chamber VR. While maintaining the airtightness of the valve chamber VR, the fluid control valve V utilizes the deflection of the diaphragm 50 so as to enable the drive force from the actuator 30 to be transmitted via the plunger 40 to the valve body 20.

The valve seat 10 is a block-shaped object formed, for example, from metal that is fitted into the housing portion B1 in the block body B. In a state in which the valve seat 10 has been fitted into the housing portion B1 in the block body B, the surface of the valve seat 10 that faces in the same direction as the predetermined surface of the block body B forms a valve seat surface 11. This valve seat surface 11 forms a portion of internal surfaces of the valve chamber VR. In addition, a first flow path L3 that communicates with the upstream-side flow path L1, and a plurality of second flow paths L4 that communicate with the downstream-side flow path L2 are also provided within the valve seat 10.

One end of the first flow path L3 opens onto a center of the valve seat surface 11, while another end thereof opens onto a surface of the valve seat 10 that faces the bottom surface of the housing portion B1. Moreover, one end of each second flow path L4 opens onto a concentric circle that is centered on the center of the valve seat surface 11, while another end thereof opens onto an outer-side surface of the valve seat 10 that faces an inner-side surface of the housing portion B1. An outer-side surface of the valve seat 10 is formed in a step shape so that the valve seat surface 11 side thereof is in close contact with the inner-side surface of the housing portion B1, and so that the surface thereof on the opposite side from the valve seat surface 11 faces the inner-side surface of the housing portion B1 via a gap 12. As a result, in a state in which the valve seat 10 has been fitted into the housing portion B1 of the block body B, the first flow path L3 is in communication with the upstream-side flow path L1, and the second flow paths L4 are in communication with the downstream-side flow path L2 via the gap 12.

A plurality of circulation grooves 13 are formed in the valve seat surface 11 in concentric circles that are centered on the center of the valve seat surface 11. A plurality of conduction holes 14 that communicate with the second flow paths L4 are disposed at equal intervals from each other in the respective circulation grooves 13. As a result, fluid that has accumulated in the valve chamber VR is evenly guided out to the second flow paths L4.

The valve body 20 is a thin plate-shaped object that is formed, for example, in the shape of a rotating body having a flat seating surface 21 that faces the valve seat surface 11. In addition, a tilt-inhibiting projection 22 that is formed in a curved shape (more specifically, in a spherical shape) is provided on the valve body 20 on a surface thereof that faces towards the diaphragm 50, which is the surface on the opposite side from the seating surface 21. Note that the tilt-inhibiting projection 22 is provided so as to face towards the plunger 40 that is connected to the diaphragm 50. In addition, the tilt-inhibiting projection 22 is provided such that an apex thereof is positioned over a central axis (shown by a single-dot chain line in FIG. 2) of the valve body 20, and such that the apex thereof is positioned over a central axis (shown by the single-dot chain line in FIG. 2) of the plunger 40. Moreover, the valve body 20 is supported on the valve seat surface 11 via a ring-shaped plate spring 24 (i.e., an elastic body) that is placed on top of a supporting ring 23 that is installed on the valve seat surface 11. As a result, the valve body 20 is caused by the plate spring 24 to resist pressing force that is acting towards the valve seat 10 side.

The actuator 30 is provided with a piezo stack 31 that is formed by stacking a plurality of layers of piezo elements, and a terminal that is used to apply voltage to the piezo stack 31, and is formed such that the piezo stack 31 is extended by the voltage applied thereto via this terminal.

The plunger 40 is a rod-shaped object having one end that is formed integrally with the diaphragm 50, and another end that extends towards the actuator 30 side. In the present embodiment, the other end side of the plunger 40 is formed as a protruding portion 41 that protrudes towards the actuator 30 side, and this protruding portion 41 is in direct contact with the actuator 30.

The diaphragm 50 performs a function of transmitting movements of the plunger 40 to the valve body 20 while maintaining the airtightness of the valve chamber VR.

Figure 3:
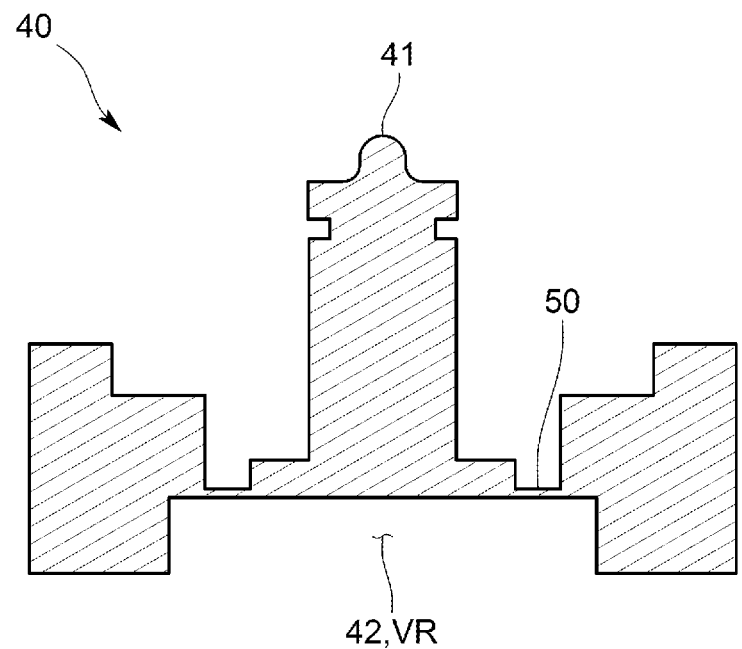
FIG. 3 is a schematic view showing a plunger and a valve body of the same embodiment.
Figure 3:
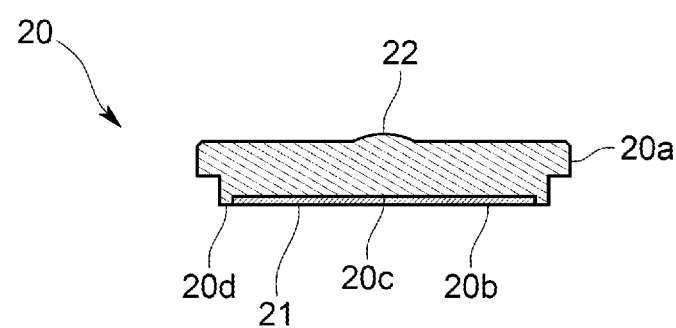

In addition, as is shown in FIG. 3, the fluid control valve V of the present embodiment is characterized in that the above-described valve body 20 is formed as a separate body from the plunger 40, and in that the seating surface 21 of the valve body 20 is formed by a resin layer 20b.

This will now be described in more detail. As is shown in FIG. 3, in the present embodiment a recessed portion 42 is provided in the surface of the plunger 40 that faces towards the valve body 20, and this recessed portion 42 forms the above-described valve chamber VR.

The valve body 20 of the present embodiment is housed within this recessed portion 42. A lower surface of the valve body 20 functions as the seating surface 21.

More specifically, the valve body 20 is equipped with a substrate 20a that is made from metal, and a resin layer 20b that covers a portion of the substrate 20a.

The substrate 20a is in direct contact with the plunger 40, and drive force from the actuator 30 is transmitted via the plunger 40. The above-described tilt-inhibiting projection 22 is provided on the surface of this substrate 20a that faces towards the plunger 40. In contrast, the recessed portion 20c is formed in the surface of the substrate 20a that faces towards the valve seat 10. In other words, an annular projecting portion 20d is provided on an outer circumference of the surface of the substrate 20a that faces towards the valve seat 10, and the inner side of this projecting portion 20d forms the recessed portion 20c.

Figure 4:
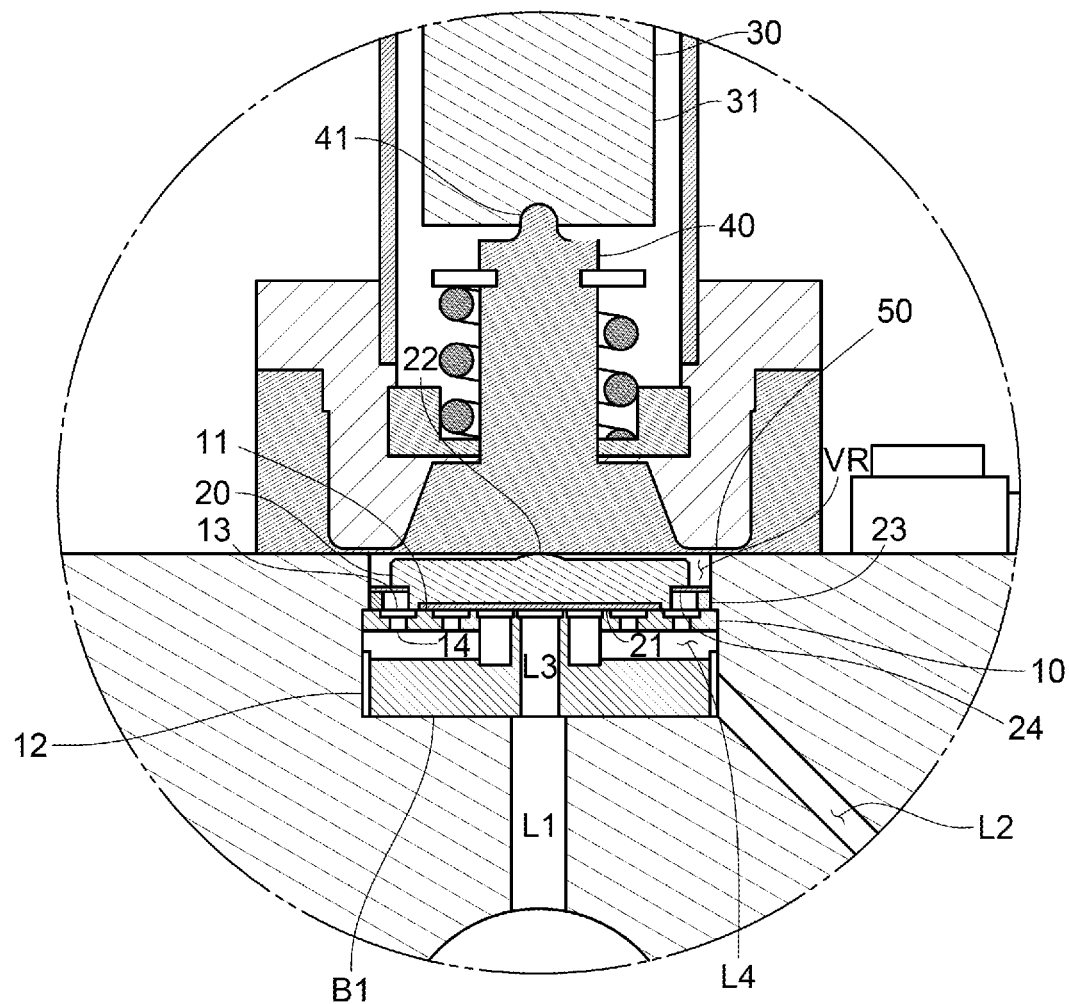
FIG. 4 is a schematic view showing a partial structure of a fluid control valve of another embodiment.

The resin layer 20b is formed using, for example, a cross-link modified fluorine-based resin and, more specifically, is formed using a modified pfa. This resin layer 20b is provided in the above-described recessed portion 20c. An example of a method used to form the resin layer 20b is a method in which, firstly, a sheet-shaped fluorine-based resin is adhered onto the above-described substrate 20a. This fluorine-based resin is then irradiated with ionizing radiation under specific conditions or the like so that the fluorine-based resin is cross-linked. Note that the cross-linking referred to here is a mutual cross-linking between resins, and does not refer to a cross-linking between a metal and a resin. Note also that, as is shown in FIG. 4, here, the seating surface 21 is formed from the resin layer 20b in a single operation on a plurality of valve bodies 20, and one of these valve bodies 20 is used as the fluid control valve V of the present embodiment.

Next, operations of the fluid control valve V according to the present embodiment will be described.

In the above-described fluid control valve V, in a state in which voltage is not being applied to the actuator 30, the valve opening (i.e., the distance between the valve seat surface 11 of the valve seat 10 and the seating surface 21 of the valve body 20) is set so as to be a predetermined value. Note that a state in which this valve opening is at the predetermined value is a fully open state of the fluid control valve V.

Next, when the above-described state changes to a state in which voltage is applied to the actuator 30, the actuator 30 is extended. The drive force that is generated in conjunction with this extension of the actuator 30 is transmitted via the plunger 40 to the valve body 20. The valve body 20 is then moved in a direction in which it comes into contact with (i.e., in a direction in which it approaches) the valve seat 10 while resisting the pressing force from the plate spring 24. As a consequence, the valve opening changes to a smaller value than the predetermined value. Note that because the amount that the actuator 30 is extended increases proportionally as the value of the voltage applied thereto is increased, by adjusting the size of the voltage value, it is possible to control the valve opening.

When the voltage applied to the actuator 30 reaches the predetermined value or greater, the valve seat surface 11 of the valve seat 10 and the seating surface 21 of the valve body 20 come into mutual contact with each other. At this time, the valve body 20 may become tilted due to the range of tolerance between the valve seat 10 and the valve body 20, however, because the valve body 20 and the plunger 40 are in mutual contact via the tilt-inhibiting projection 22, any tilting of the plunger 40 that might be caused by this tilting is inhibited.

Next, if the voltage applied to the actuator 30 is then reduced, the actuator 30 is pulled back. In conjunction with this pullback of the actuator 30, the valve body 20 is moved by the pressing force of the plate spring 24 in a direction in which it separates from (i.e., in a direction further away from) the valve seat 10. As a result, the valve opening becomes a larger value.

According to the fluid control valve V which is formed in this manner, because valve body 20 is formed as a separate body from the plunger 40 on which the diaphragm 50 is provided, an enlargement of the seating surface 21 can be achieved without the surface area of the diaphragm 50 having to be reduced, in other words, without having to sacrifice the drive range of the valve body 20 because of the diaphragm. As a result, it is possible to ensure the sealing performance while forming the seating surface 21 using the resin layer 20b.

Furthermore, because the valve body 20 is formed as a separate body from the plunger 40, it is possible, for example to adhere a single sheet of fluorine-based resin to a plurality of valve bodies 20, so that the seating surface 21 can be formed from the resin layer 20b on the plurality of valve bodies 20 in a single operation, thereby enabling an improvement in productivity to be achieved.

Moreover, the fluid control valve V of the present embodiment is a 'normal open type' of valve. Compared with a 'normal closed type' of fluid control valve, the problem of sheet leaks in a closed state is more conspicuous in this normal open type of fluid control valve, so that the effect of an improved sealing performance provided by the seating surface 21 that is formed using the above-described resin layer 20b is demonstrated even more conspicuously.

In addition, because the resin layer 20b is a cross-linked modified fluorine-based resin, and because this cross-linked modified fluorine-based resin is covalently bonded with the metal substrate 20a during the cross-linking, the cross-linked modified fluorine-based resin is adhered directly to the substrate 20a. As a result, it is possible to eliminate the need for an adhesive layer such as a primer or the like that might possibly become a source of contamination.

Moreover, because covalent bonding forms a far stronger bond in comparison to coordinate bonds, ionic bonds, and intermolecular force and the like, the cross-linked modified fluorine-based resin and the metal substrate 20a can be adhered stably together by means of a strong bonding force.

In addition to this, because the elasticity of the cross-linked modified fluorine-based resin is improved compared to the elasticity thereof before it was modified, the seating surface 21 can be placed in contact with the valve seat surface 11, and also separated therefrom, without becoming stuck thereto, so that an effect of an improved responsiveness of the fluid control valve V can be anticipated.

Moreover, because the recessed portion 20c is formed in the surface of the substrate 20a that faces towards the valve seat 10, and because the resin layer 20b is formed in this recessed portion 20c, an improvement in workability during the steps of planing and polishing the resin layer 20b can be achieved.

Furthermore, because the valve body 20 and the plunger 40 are in mutual contact with each other via the tilt-inhibiting projection 22, it is difficult for any tilt of the valve body 20 that is generated as a result of the contact between the valve body 20 and the valve seat 10 to be transmitted to the plunger 40. As a consequence, the tilt of the plunger 40 relative to the valve seat 10 can easily be maintained as a constant tilt. Furthermore, it is difficult for residual fluid to accumulate in the gap between the valve body 20 and the plunger 40, so that even if the valve body 20 and the plunger 40 are maintained in a state of mutual contact with each other, it is difficult for the valve body 20 and the plunger 40 to deteriorate as a result of this.

ADDITIONAL EMBODIMENTS

Note that the present invention is not limited to the above-described embodiment.

For example, in the above-described embodiment, the recessed portion 42 is provided in the surface of the plunger 40 that faces towards the valve body 20, and the valve body 20 is housed within this recessed portion 42, however, as is shown in FIG. 4, by forming the housing portion B1 in the block body B to a deeper depth than is the case in the present embodiment, it is also possible for the valve body 20 to be housed within the housing portion B1. If this type of structure is employed, then because there is no longer any need to form the recessed portion 42 in the plunger 40, it is possible, for example, for a plunger 40 having a conventional structure to be employed.

Figure 5:
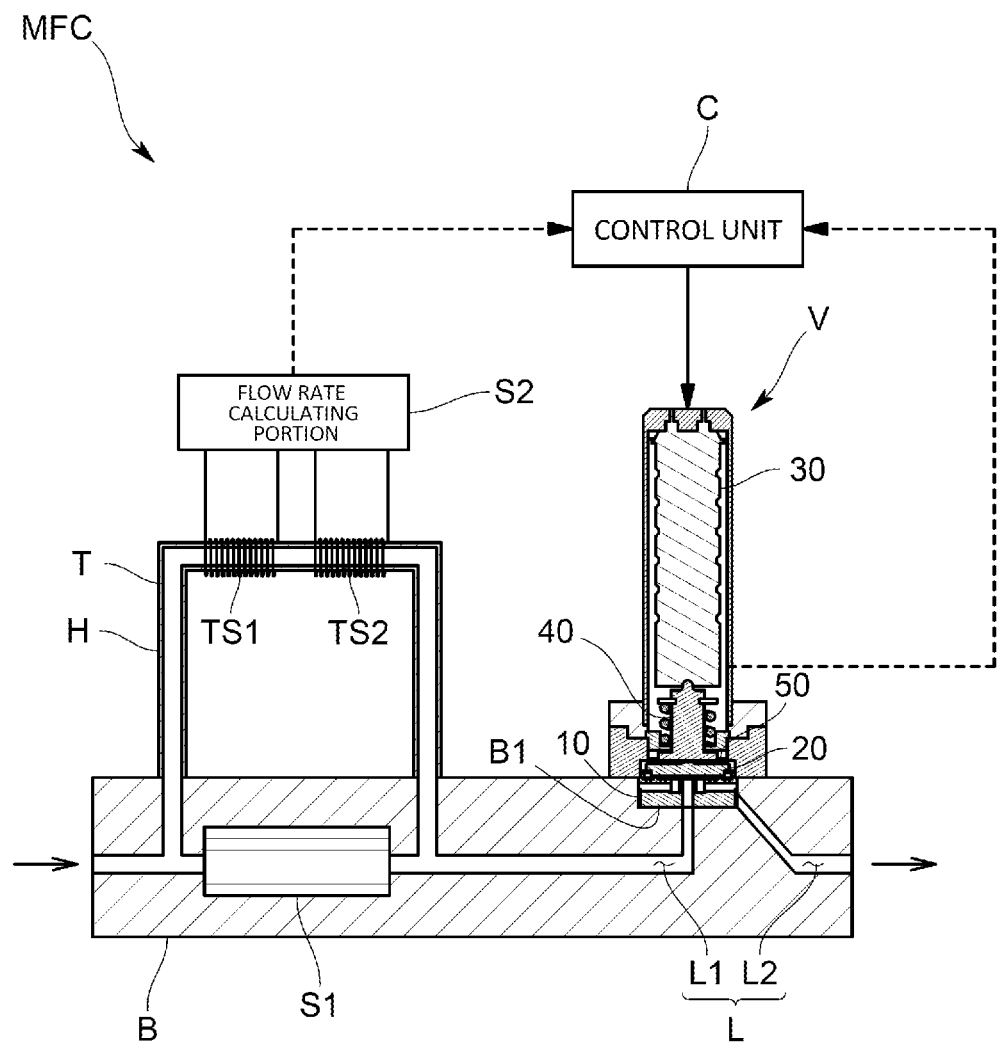
FIG. 5 is a schematic view showing an overall structure of a fluid control device of another embodiment.

Moreover, in the above-described embodiment, a description is given of a case in which a differential pressure type of MFC is used for the fluid control device MFC, however, as is shown in FIG. 5, a thermal type of MFC may also be used. More specifically, this thermal MFC is equipped with a narrow tube T that is parallel-connected to the flow path L in such a way that a predetermined proportion of the fluid flowing along the flow path L is diverted to the narrow tube T, a heater H that is provided on the narrow tube T, and a pair of temperature sensors TS1 and TS2 that are provided before and after the heater H. When a fluid flows along the narrow tube T, a temperature difference is generated corresponding to the mass flow rate of this fluid between the two temperature sensors TS1 and TS2. The flow rate is then measured based on this temperature difference.

Figure 6:
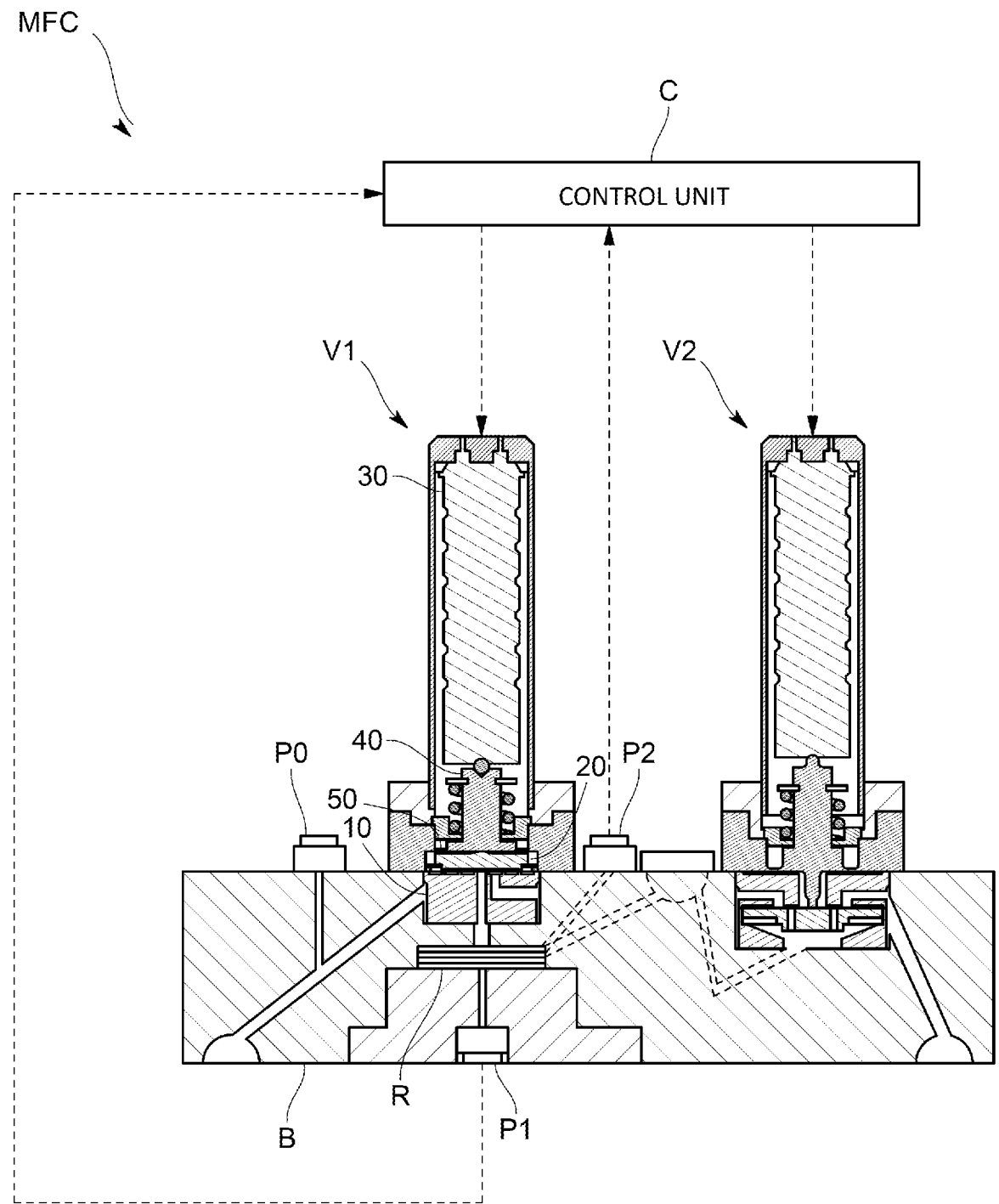
FIG. 6 is a schematic view showing an overall structure of a fluid control device of another embodiment.
Figure 7:
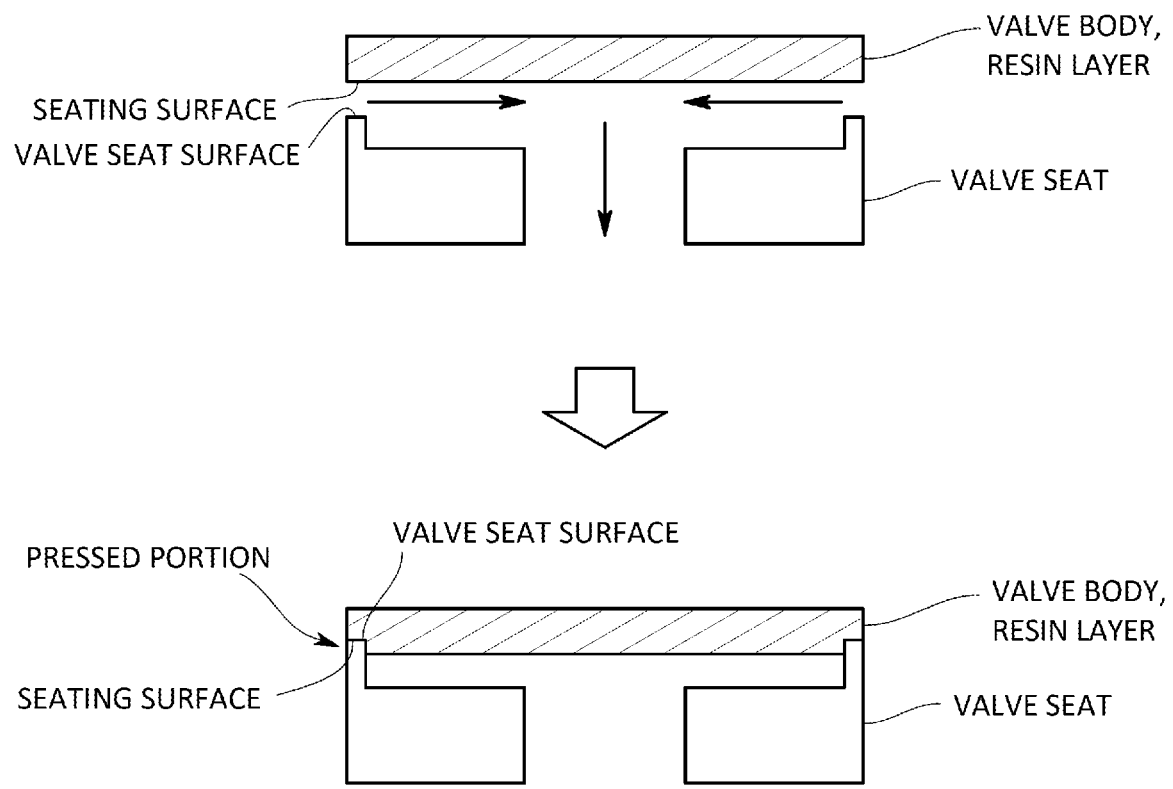
FIG. 7 is a schematic view showing a state in which a resin layer, which forms a seating surface, is pressed in by a valve seat surface.

Furthermore, as is shown in FIG. 6, it is also possible for a plurality of fluid control valves V1 and V2 to be provided as the fluid control device MFC. More specifically, this thermal MFC is equipped with a resistor R through which the fluid passes, a primary-side pressure sensor P0, a first pressure sensor P1, a second pressure sensor P2, an upstream-side fluid control valve V1, and a downstream-side fluid control valve V2 that are each disposed on an outer surface of the block body B, and a control unit C that controls the upstream-side fluid control valve V1 and the downstream-side fluid control valve V2. Note that, in FIG. 6, the upstream-side fluid control valve V1 is formed using the structure according to the present invention, however, it is also possible for the downstream-side fluid control valve V2 to instead be formed using the structure according to the present invention, or for both the upstream-side fluid control valve V1 and the downstream-side fluid control valve V2 to be formed using the structure according to the present invention.

Furthermore, the resin layer 20*b* is not limited to being formed using a cross-linked modified fluorine-based resin, and may instead be formed using any one of a variety of resins such as, for example, polyester resins such as polyamides, polycarbonates, and PBT and the like, epoxy resins, and unsaturated polyester resins and the like. In the case of these resins, because there is no longer a need for an adhesive agent, a reactive functional group is formed, for example, by using a specific chemical agent on the surface of the meal substrate 20*a* or the like, and then creating a chemical bond by heating this reactive functional group and the resin or the like.

As the fluorine-based resin, it is possible to use one of the following copolymers, namely, a tetrafluoroethylene copolymer, a tetrafluoroethylene-perfluoro (alkyl vinyl ether) copolymer, a tetrafluoroethylene-hexafluoropropylene copolymer, a tetrafluoroethylene-ethylene copolymer, or a polychlorotrifluoroethylene copolymer, or to use a resin obtained by combining two or more of these copolymers Furthermore, the method used to form the resin layer 20*b* may be one in which, prior to forming the resin layer 20*b* on the substrate 20*a*, surface roughening is performed on the surface of the substrate 20*a* by performing blast processing thereon so as to increase the surface area thereof, and so as to enable to the chemical bonding between the resin layer 20*b* and the substrate 20*a* to be formed more easily. Note that the chemical bond referred to here is not limited to being the above-described covalent bond, and may also be a coordinate bond, an ionic bond, or a bond created by intermolecular force or the like.

In the above-described embodiment, the present invention is described using a normal open type of fluid control valve V as an example, however, the present invention can also be applied to a normal closed type of fluid control valve.

Moreover, in the above-described embodiment, a piezo element (i.e., a piezo stack) is used as the actuator 30 of the fluid control valve V, however, it is also possible for a solenoid or the like to be used.

Furthermore, it should be understood that the present invention is not limited to the above-described embodiments, and that various modifications and the like may be made thereto insofar as they do not depart from the spirit or scope of the present invention.

LIST OF REFERENCE CHARACTERS

MFC . . . Fluid Control Device
V . . . Fluid Control Valve
10 . . . Valve Seat
11 . . . Valve Seat Surface
20 . . . Valve Body
21 . . . Seating Surface
22 . . . Tilt-inhibiting Projection
20*b* . . . Resin Layer
30 . . . Actuator
40 . . . Plunger
50 . . . Diaphragm

What is claimed is:

1. A fluid control valve that is formed such that drive force from an actuator is transmitted to a valve body via a plunger using deflection of a diaphragm, and that controls a flow rate of a fluid by causing a seating surface of the valve body to move towards or away from a valve seat surface of a valve seat, wherein
the valve body is a separate body from the plunger and is a separate body from the diaphragm,
the fluid control valve is mounted on a block body and a recessed housing portion is provided in the block body,
the valve seat and the valve body are housed within the recessed housing portion,
the seating surface faces away from the plunger and is formed by a resin layer,
in a state in which voltage is not being applied to the actuator, a gap is formed between the seating surface and the valve seat surface, and
when voltage is applied to the actuator, the valve body is made to approach the valve seat by drive force from the actuator so as to reduce the flow rate.

2. The fluid control valve according to claim 1, wherein the seating surface is a lower surface of the valve body.

3. The fluid control valve according to claim 1, wherein the resin layer is formed using a cross-link modified fluorine-based resin.

4. The fluid control valve according to claim 1, wherein the resin layer is provided in a recessed portion that is formed in the valve body.

5. The fluid control valve according to claim 1, wherein the valve body and the plunger are in mutual contact via a tilt-inhibiting projection that inhibits tilting of the plunger that is generated by the contact between the valve seat and the valve body.

6. A fluid control device comprising the fluid control valve according to claim 1.

* * * * *